US008328627B2

(12) United States Patent
Mezen et al.

(10) Patent No.: US 8,328,627 B2
(45) Date of Patent: Dec. 11, 2012

(54) GAMING MACHINE WITH PLAYER PREDICTABLE VOLATILITY

(75) Inventors: Brett Mezen, Rosebery (AU); Naomi Classon, Lane Cove (AU); Scott Olive, Rosebery (AU)

(73) Assignee: Aristocrat Technologies Australia Pty (AU)

( * ) Notice: Subject to any disclaimer, the term of this patent is extended or adjusted under 35 U.S.C. 154(b) by 1219 days.

(21) Appl. No.: 12/045,527

(22) Filed: Mar. 10, 2008

(65) Prior Publication Data

US 2008/0200230 A1 Aug. 21, 2008

Related U.S. Application Data

(63) Continuation of application No. 10/734,001, filed on Dec. 10, 2003, now Pat. No. 7,374,485.

(30) Foreign Application Priority Data

Dec. 10, 2002 (AU) ................................ 2002953243

(51) Int. Cl.
*A63F 13/00* (2006.01)

(52) U.S. Cl. ................ 463/25; 463/16; 463/17; 463/18; 463/19; 463/20; 463/21; 463/22; 463/23; 463/26; 463/28

(58) Field of Classification Search .............. 463/16-21, 463/22-23, 40-43, 25-28
See application file for complete search history.

(56) References Cited

U.S. PATENT DOCUMENTS

2002/0198044 A1* 12/2002 Walker et al. .................. 463/25

* cited by examiner

*Primary Examiner* — Sunit Pandya
(74) *Attorney, Agent, or Firm* — McAndrews, Held & Malloy, Ltd.

(57) ABSTRACT

A gaming machine has a display and a game controller arranged to control images of symbols displayed on the display. The game controller is arranged to play a game wherein at least one random event is caused to be displayed on the display. If a predefined winning event occurs, the machine awards a prize. The gaming machine further comprises a selector applicable to a game feature where, upon a trigger condition occurring in a base game, a player is afforded an opportunity of predicting an outcome of the feature and, if the player's prediction is correct, a bonus is awarded to the player.

8 Claims, 5 Drawing Sheets

GAMING MACHINE WITH PLAYER PREDICTABLE VOLATILITY

RELATED APPLICATIONS

This application claims priority to and benefit as a continuation of U.S. patent application Ser. No. 10/734,001, filed on Dec. 10, 2003, entitled "Gaming Machine With Player Predictable Volatility," which claims priority to Australian Application No. 2002953243, filed on Dec. 10, 2002, each of which is herein incorporated by reference in its entirety.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

SUMMARY OF THE INVENTION

According to a first aspect of the invention, there is provided a gaming machine having a display and a game controller arranged to control images of symbols displayed on the display, the game controller being arranged to play a game wherein at least one random event is caused to be displayed on the display and, if a predefined winning event occurs, the machine awards a prize, the gaming machine further comprising a selector applicable to a game feature where, upon a trigger condition occurring in a base game, a player is afforded an opportunity of predicting an outcome of the feature and, if the player's prediction is correct, a bonus is awarded to the player.

By allowing the player to predict the outcome of a game feature, the player is, effectively, selecting their desired volatility of the outcome of the game feature.

The game feature may be a series of free games. The outcome in respect of which the player can make the prediction may constitute one of a number of possible outcomes of game features. For example, the outcome may be the occurrence of a particular symbol during the playing of the series of free games constituting the game feature. Instead, the outcome may be a prediction of an amount won during the game feature.

The bonus which is awarded may be related to the degree of difficulty of achieving the outcome. More particularly, the higher the degree of difficulty of achieving an outcome, the greater the bonus that is awarded if the player's prediction is correct.

The display may include a meter for displaying information related to the outcome. Thus, if the game feature is a series of free games and the outcome on which the player makes a prediction is the collection of a number of symbols, a part of the display means, at least during the playing of the game feature, may include a meter which is incremented each time one of the symbols appears during the playing of the free games. Preferably, the symbols could appear anywhere in the display and need not occur on a bought payline.

The selector may be a touch screen implemented device for enabling the player to select one of a number of icons relating to potential game feature outcomes.

The bonus which is awarded may be multiplied by the number of credits bet in the underlying base game.

According to a second aspect of the invention, there is provided a method of playing a game on a gaming machine, the gaming machine having a display and being controlled by a game controller arranged to control images displayed on the display, the gaming machine including a selector applicable to a game feature and the method including, upon a trigger condition occurring in a base game, affording a player an opportunity of predicting an outcome of the feature and, if the player's prediction is correct, awarding a bonus to the player.

The method may include implementing the game feature as a series of free games.

Further, the method may include rendering the outcome in respect of which the player can make the prediction as one of a number of possible outcomes of game features. Thus, for example, the method may include rendering the outcome as the occurrence of a particular symbol during the playing of the series of free games constituting the game feature. Instead, the method may include rendering the outcome as a prediction of an amount won during the game feature.

The method may include relating the bonus which is awarded to the degree of difficulty of achieving the outcome. The higher the degree of difficulty of achieving an outcome, the greater the bonus that is awarded if the player's prediction is correct.

The method may include displaying information related to the outcome on a meter of the display.

Still further, the method may include implementing the selector as a touch screen implemented device for enabling the player to select one of a number of icons relating to potential game feature outcomes.

The method may include multiplying the bonus which is awarded by the number of credits bet in the underlying base game.

BRIEF DESCRIPTION OF THE DRAWINGS

The invention is now described by way of example with reference to the accompanying diagrammatic drawings in which.

DETAILED DESCRIPTION OF THE PREFERRED EMBODIMENT

Figure 1:
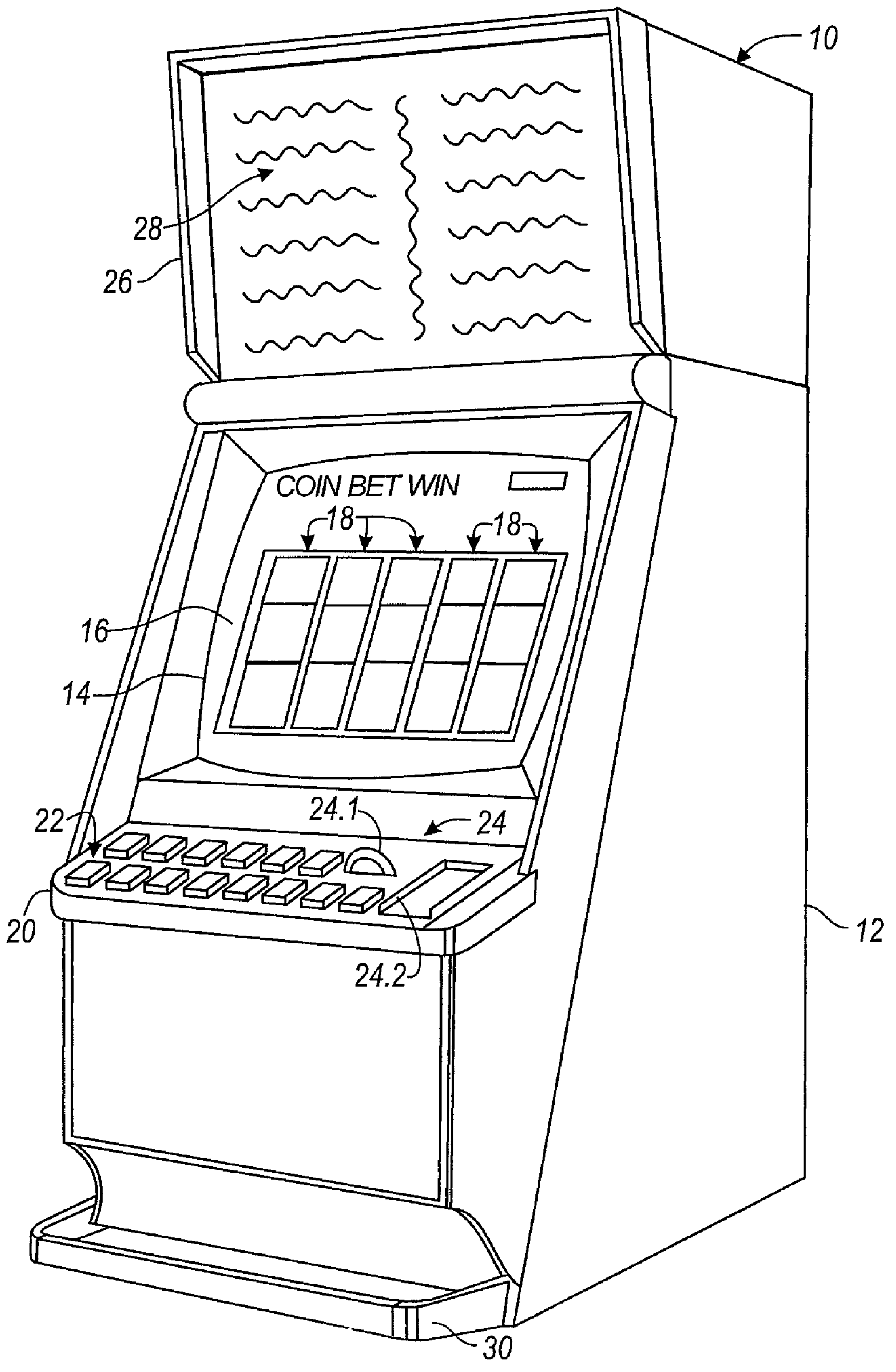
FIG. 1 shows a perspective view of a gaming machine, in accordance with an embodiment of the invention.

In FIG. 1, reference numeral 10 generally designates a gaming machine, including a game, in accordance with the invention. The machine 10 includes a console 12 having a display means in the form of a video display unit 14 on which a game 16 is played, in use. The video display unit 14 may be implemented as a cathode ray screen device, a liquid crystal display, a plasma screen, or the like. The game 16 is a spinning reel game which simulates the rotation of a number of spinning reels 18. A midtrim 20 of the machine 10 houses a keypad 22 containing buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
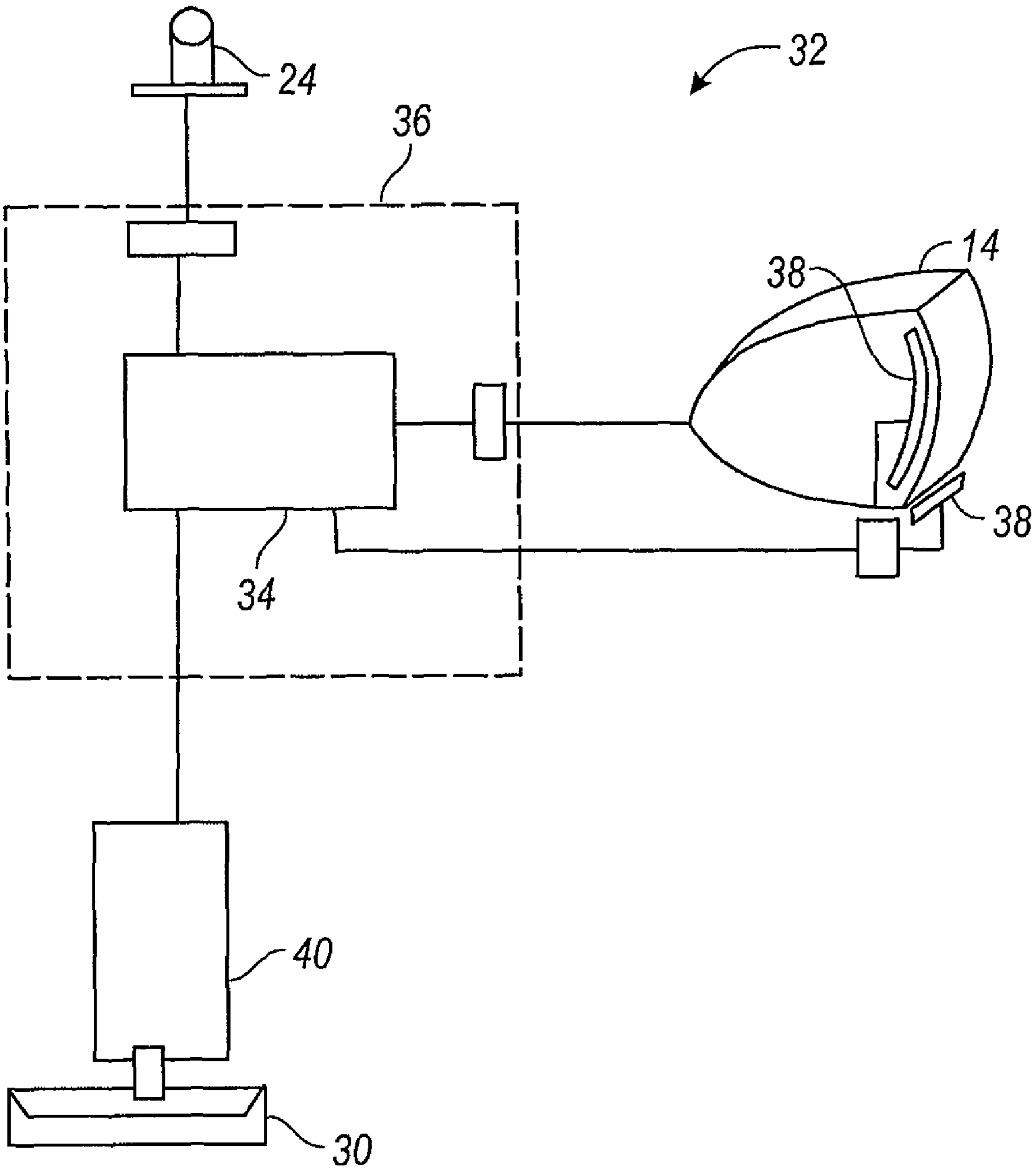
FIG. 2 shows a block diagram of a control circuit of the gaming machine.

Referring to FIG. 2 of the drawings, a control means or control circuit 32 is illustrated. A program which implements the game and user interface is run on a processor 34 of the control circuit 32. The processor 34 forms part of a controller 36 that drives the screen of the video display unit 14 and that receives input signals from sensors 38. The sensors 38 include sensors associated with the keypad 22 and touch sensors mounted in the screen of the video display unit 14. The controller 36 also receives input pulses from the mechanism 24 to determine whether or not a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

Figure 3:
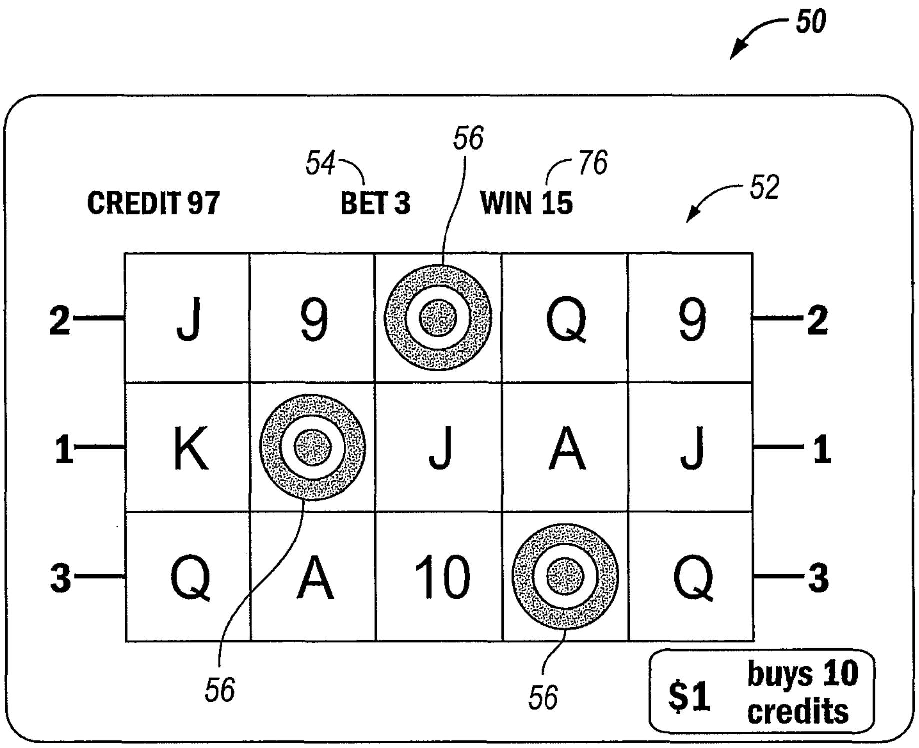
FIG. 3 shows a screen display of a base game of a game, also in accordance with an embodiment of the invention, played on the gaming machine of FIG. 1.

In FIG. 3 of the drawings, reference numeral 50 generally designates a screen display of a base game 52 of the game 16 played on the gaming machine 10. The game 16 is a spinning reel game having a video representation of five spinning reels 18. It is assumed that the game 16 has three paylines on which the player can bet marked as numeral "1", "2" and "3" in FIG. 3 of the drawings. It is to be noted from abet meter 54 in the display 50 that the player has bet on all three paylines.

In the screen display 50, three roundel symbols 56 are displayed in a scatter configuration. The symbols 56 are scatter symbols and the occurrence of three of the symbols 56 results in the triggering of a game feature of the game 16. The game feature is a series of free games, for example, fifteen free games.

The game feature allows the player to predict what will happen during the free games of the game feature. A bonus prize is awarded if the player's prediction is correct.

The game 16 and, in particular, the game feature has an aviation theme, hence the roundel scatter symbols 56.

Figure 4:
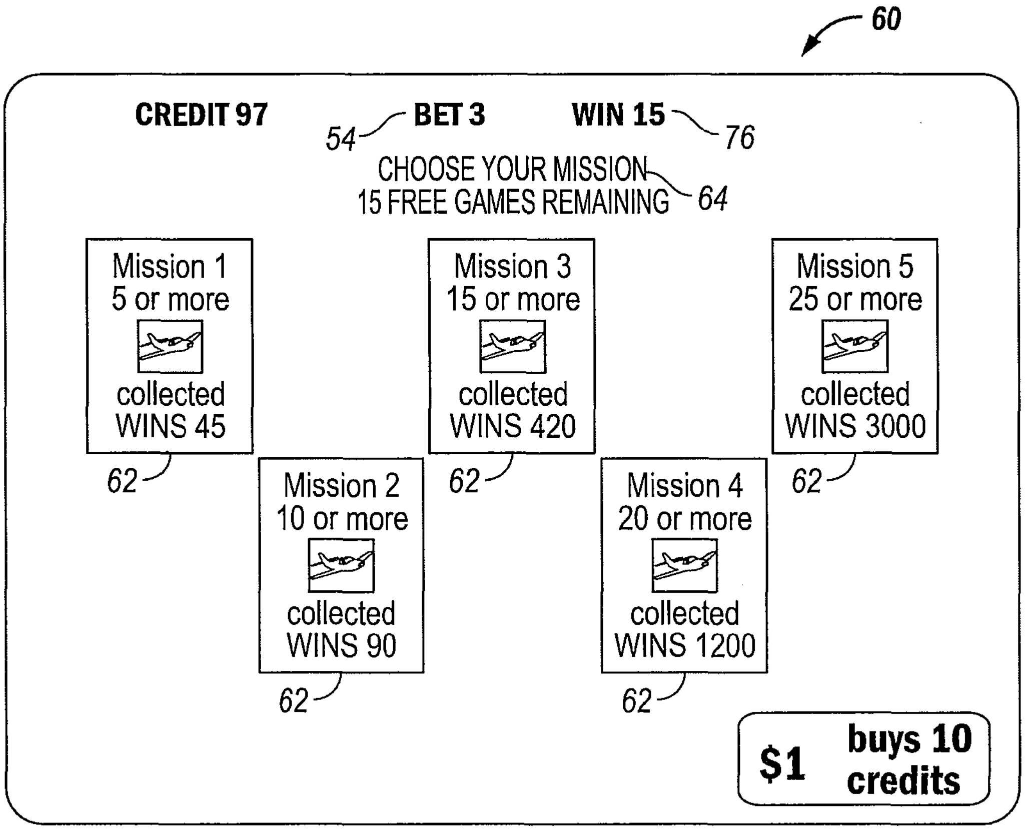
FIG. 4 shows an initial screen display of a game feature of the game following the base game.

When the trigger condition occurs in the base game 52, the screen display 50 changes to a screen display 60 as shown in FIG. 4 of the drawings. The screen display 60 comprises a selection of possible outcomes 62. The player chooses one of the outcomes 62 by touching the appropriate part of the screen of the video display unit 14 or by pressing one of the buttons of the keypad 22 of the gaming machine 10. A message "Choose your Mission" 64 is also displayed. In the game feature illustrated the possibilities are as follows:

collect 5 or more "plane" symbols to win a bonus of 15 credits;

collect 10 or more "plane" symbols to win a bonus of 30 credits;

collect 15 or more "plane" symbols to win a bonus of 140 credits;

collect 20 or more "plane" symbols to win a bonus of 400 credits; and collect 25 or more "plane" symbols to win a bonus of 1000 credits.

It will be noted that the more bonus symbols (the "plane" symbols) which need to be collected the higher the bonus which is awarded. Thus, the player has the opportunity to select their desired volatility of the game feature and, if the player's prediction is correct, the bonus amount is awarded to the player. Thus, the player can predict that fewer bonus symbols will occur in the playing of the series of free games with a lower bonus prize being awarded. Instead, the player can predict that a larger number of bonus symbols will occur during the playing of the series of free games with a higher bonus prize being paid if the player's prediction is correct.

It is also to be noted in FIG. 4 of the drawings that the bonus prize which is awarded is multiplied by the number of credits wagered in the base game 52. Therefore, because the player was playing one credit per line on all three paylines in the base game 52 of the game 16, the bonus award will be multiplied by three. Thus, as illustrated in FIG. 4 of the drawings, each indicated bonus award is the base award multiplied by the number of credits wagered.

Figure 5:
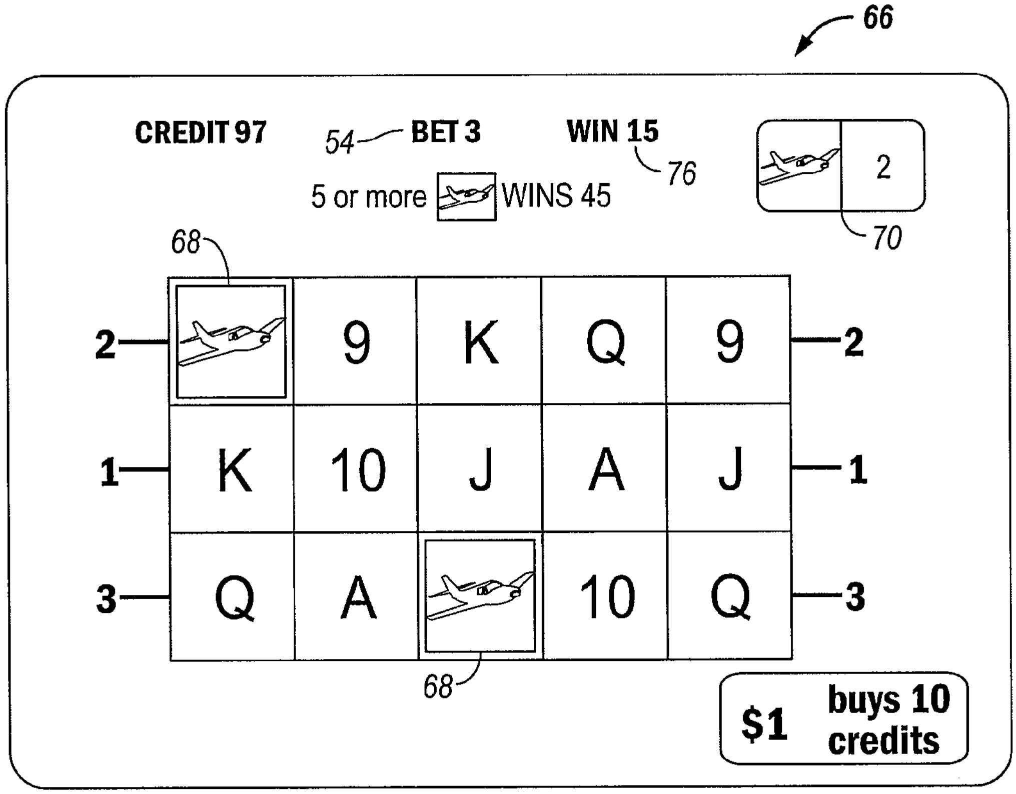
FIG. 5 shows a screen display during the playing of the game feature.

The player commences the game feature by selecting the appropriate outcome 62. It is assumed that the player has selected "Mission 1" by touching that icon on the screen display 60. FIG. 5 shows a screen display 66 after a first free game of the series of free games of the game feature. Two "plane" symbols 68 were spun up in the first free game and a bonus symbol meter 70 in the display 66 is incremented by two as illustrated.

Figure 6:
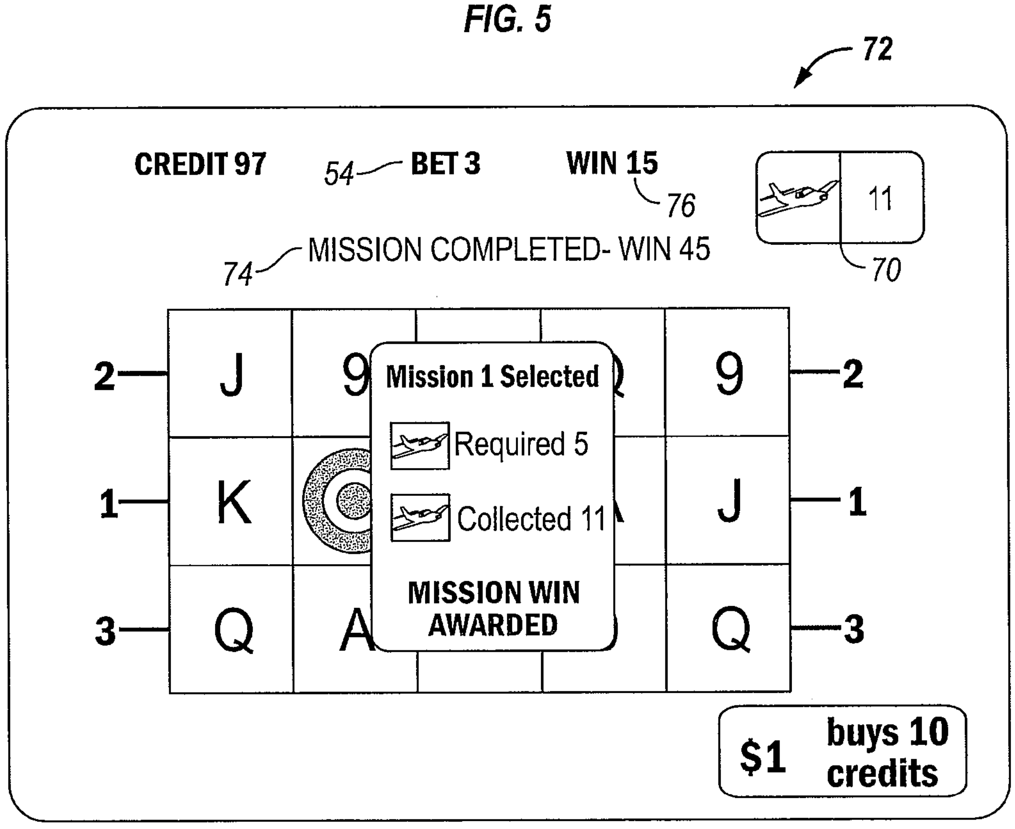
FIG. 6 shows a screen display at the end of the game feature.
Figure 7:
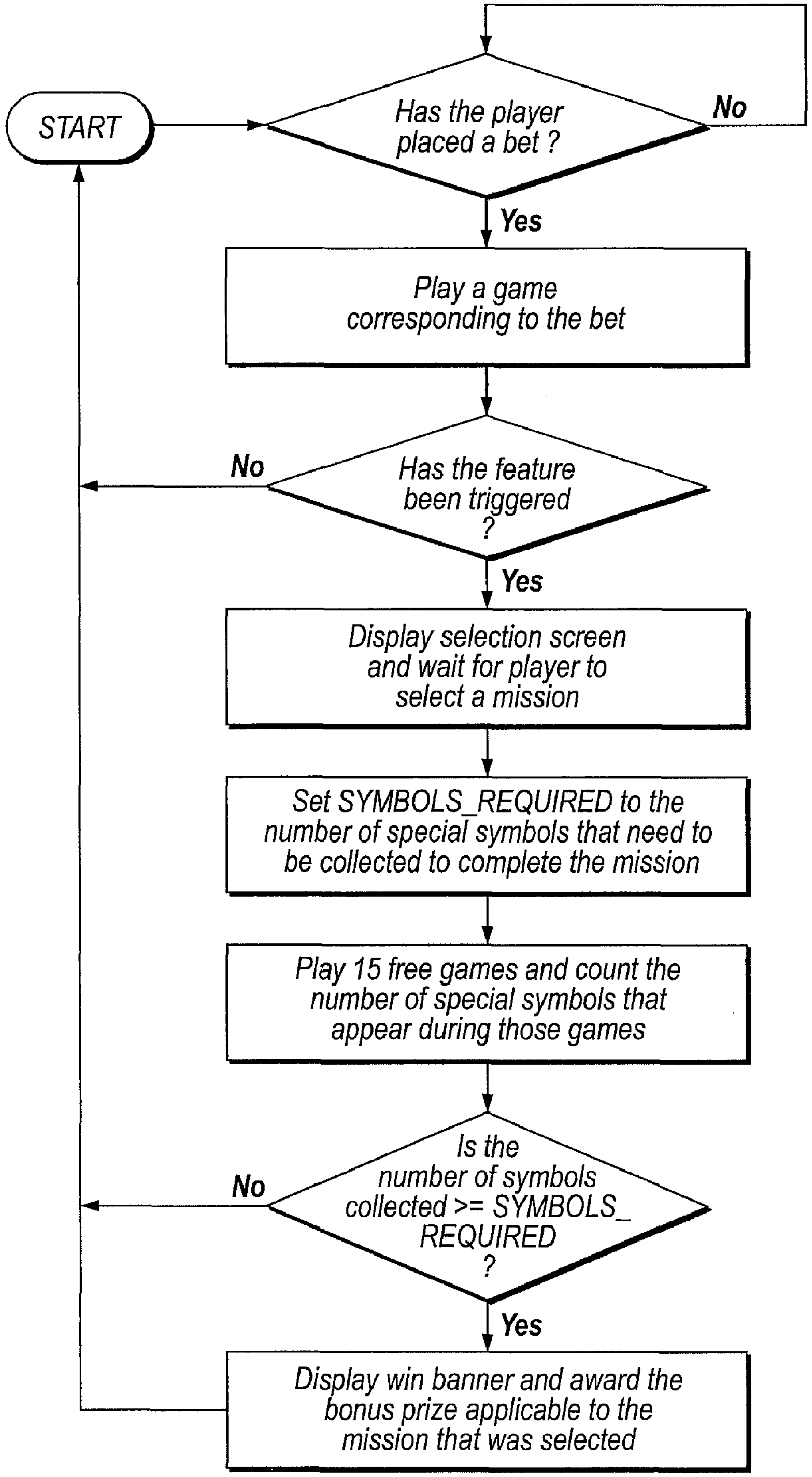
FIG. 7 shows a flow chart of the game played on the gaming machine of FIG. 1.

As indicated above, the game feature comprises a series of fifteen free games. FIG. 6 shows a screen display 72 at the end of the series of free games. As described above, it is assumed that the player selected the first outcome where fifteen credits, multiplied by the number of credits wagered, i.e. 45 credits, is awarded for the player correctly predicting the outcome of the series of free games.

Because the player had to collect five or more "plane" symbols 68 but the player actually collected 1l "plane" symbols as shown on the bonus symbol meter 70 in FIG. 6 of the drawings, the bonus of 45 credits is awarded but is added to a win meter 76. This is accompanied by a message 74 on the screen of the screen display 72. The game feature and the game 16 are then at an end.

In the examples set out above, the outcome which the player predicts is the minimum number of special symbols, the bonus symbols, that will occur during the series of free games constituting the game feature. The bonus prize awarded changes depending on the difficulty of achieving the prediction.

In other implementations of the invention, there could be multiple symbols which increment the meter 70 and/or symbols which increment the meter 70 by different amounts.

Still another implementation of the game feature could be the prediction of the amount won during a game or series of free games of a game feature. Thus, a series of free games may be awarded on the occurrence of a trigger condition in an underlying base game. A second screen appears displaying five options. The player chooses one of the options by touching the screen overlying that option or using one of the buttons on the keypad 22 of the gaming machine 10. The options could, for example, be as follows:

a free game win of 10 credits or more wins a bonus of 15 credits;

a free game win of 25 credits or more wins a bonus of 40 credits;

a free game win of 50 credits or more wins a bonus of 100 credits;

a free game win of 75 credits or more wins a bonus of 250 credits; and a free game win of 100 credits or more wins a bonus of 500 credits.

Once again, the bonus amount is multiplied by the number of credits bet in the underlying base game. For example, if twenty lines were being played then if the player had selected the first option and had correctly predicted the outcome a bonus of 300 credits would be awarded. The bonus could be awarded for each free game during the series of free games or for the sum of the credits won during the playing of all of the free games of the game feature.

Accordingly, it is an advantage of the invention that a game feature is provided which enables a player to predict an outcome in the game feature where, the lower of the likelihood of the outcome being achieved, the higher the prize awarded. Thus, the player can select an easier outcome with a lower bonus award being made or a more difficult outcome with a higher bonus award being made if the prediction is correct. This will enhance the enjoyment of the player in playing the game.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A gaming machine comprising, a display and a game controller arranged to control images of symbols displayed on the display, the game controller arranged to, once a player has staked a wager, play a first game in which at least one random game outcome is displayed on the display, the game controller further arranged to control the award of a prize if the at least one random game outcome corresponds to a winning outcome;

the game controller being further arranged to award a plurality of second games upon the occurrence of a trigger event, each of the plurality of second games having a plurality of possible second game outcomes;

the gaming machine further comprising a selector that is arranged to allow the player to specify a game credit amount needed to be rewarded from play of the plurality of second games to obtain the award of a bonus amount;

the game controller being arranged to control the award of the bonus amount when the number of game credits rewarded from play of the plurality of second games satisfies a criterion that is based on the specified game credit amount;

wherein the bonus amount has a value that is based on a probability of the game credits rewarded from play of the plurality of second games meeting the criterion, the probability of meeting the criterion decreasing as the game credit amount specified by the player increases such that winning the bonus amount is more difficult, the bonus amount having a higher value in compensation for such a decrease in the probability of meeting the criterion.

2. The gaming machine as claimed in claim 1, in which the criterion comprises a range of credits, wherein the number of the game credit amount is within the range of credits.

3. The gaming machine as claimed in claim 1, in which the selector is a touch screen device arranged to allow the player to select one of the plurality of second game options, each of the plurality of second game options having a different value for the game credit amount.

4. The gaming machine as claimed in claim 1, in which the awarded bonus amount is multiplied by a number of credits staked as the wager.

5. A method for use with a gaming machine that has a display and a game controller arranged to control images of symbols displayed on the display, the game controller arranged to, once a player has staked a wager, play a first game in which at least one random game outcome is displayed on the display, the game controller further arranged to control the award of a prize if the at least one random game outcome corresponds to a winning outcome, the gaming controller being further arranged to determine whether a trigger event occurs during play of the first game, the method comprising the steps of:

awarding a plurality of second games subsequent to the game controller determining that the trigger event has occurred, each of the plurality of second games having a plurality of possible game outcomes;

receiving from the player a prediction regarding a number of possible credits that maybe awarded to the player as a result of playing the plurality of second games;

determining if a number of actual credits awarded to the player as a result of playing the plurality of second games meets a criterion that is based on the number of possible credits specified by the player; and awarding an award if the number of actual credits awarded meets the criterion, wherein the award is based on a probability associated with of the number of actual credits awarded meeting the criterion, the probability of winning the award being lower in proportion to the predicted number of possible credits being higher such that winning the award is more difficult, the award having a higher value in compensation for the award being more difficult to win.

6. The method as claimed in claim 5, wherein the criterion comprises a range of credits, wherein the number of possible credits is within the range of credits.

7. The method as claimed in claim 5, wherein the step of receiving from the player a prediction regarding a number of possible credits comprises the steps of: presenting the player with a plurality of options each of which represents a different value for the number of possible credits; and determining which of the options is selected by the player.

8. The method as claimed in claim 5, further comprising the step of multiplying the award by a number of credits staked as the wager.

* * * * *

UNITED STATES PATENT AND TRADEMARK OFFICE

CERTIFICATE OF CORRECTION

PATENT NO. : 8,328,627 B2
APPLICATION NO. : 12/045527
DATED : December 11, 2012
INVENTOR(S) : Brett Mezen, Naomi Glasson and Scott Olive It is certified that error appears in the above-identified patent and that said Letters Patent is hereby corrected as shown below:

Please correct section (75) on the Title Page of the patent as follows:

delete "(75) Brett Mezen, Rosebery (AU); Naomi Classon, Lane Cove (AU); Scott Olive, Rosebery (AU)";

and, insert --(75) Brett Mezen, Rosebery (AU); Naomi Glasson, Lane Cove (AU); Scott Olive, Rosebery (AU)--.

Signed and Sealed this
Nineteenth Day of March, 2013

Teresa Stanek Rea
*Acting Director of the United States Patent and Trademark Office*